No. 690,328. Patented Dec. 31, 1901.
J. SMITH.
HARROW.
(Application filed June 4, 1901.)
(No Model.)

Witnesses:
W. Imrie
John F. Robb

Inventor,
Jacob Smith
By A. S. & A. B. Lacey Attys.

UNITED STATES PATENT OFFICE.

JACOB SMITH, OF TEKOA, WASHINGTON.

HARROW.

SPECIFICATION forming part of Letters Patent No. 690,328, dated December 31, 1901.

Application filed June 4, 1901. Serial No. 63,154. (No model.)

*To all whom it may concern:*

Be it known that I, JACOB SMITH, a citizen of the United States, residing at Tekoa, in the county of Whitman and State of Washington, have invented certain new and useful Improvements in Harrows; and I do hereby declare the following to be a full, clear, and exact description of the invention, such as will enable others skilled in the art to which it appertains to make and use the same.

This invention relates to harrows, and has for its object to provide an implement of this character which is readily adjustable and which will operate in a dead-furrow and depressed places in the surface over which the harrow may be drawn, thereby loosening and pulverizing the soil within the track of the implement and obviating the necessity for going over the field a second time.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1:
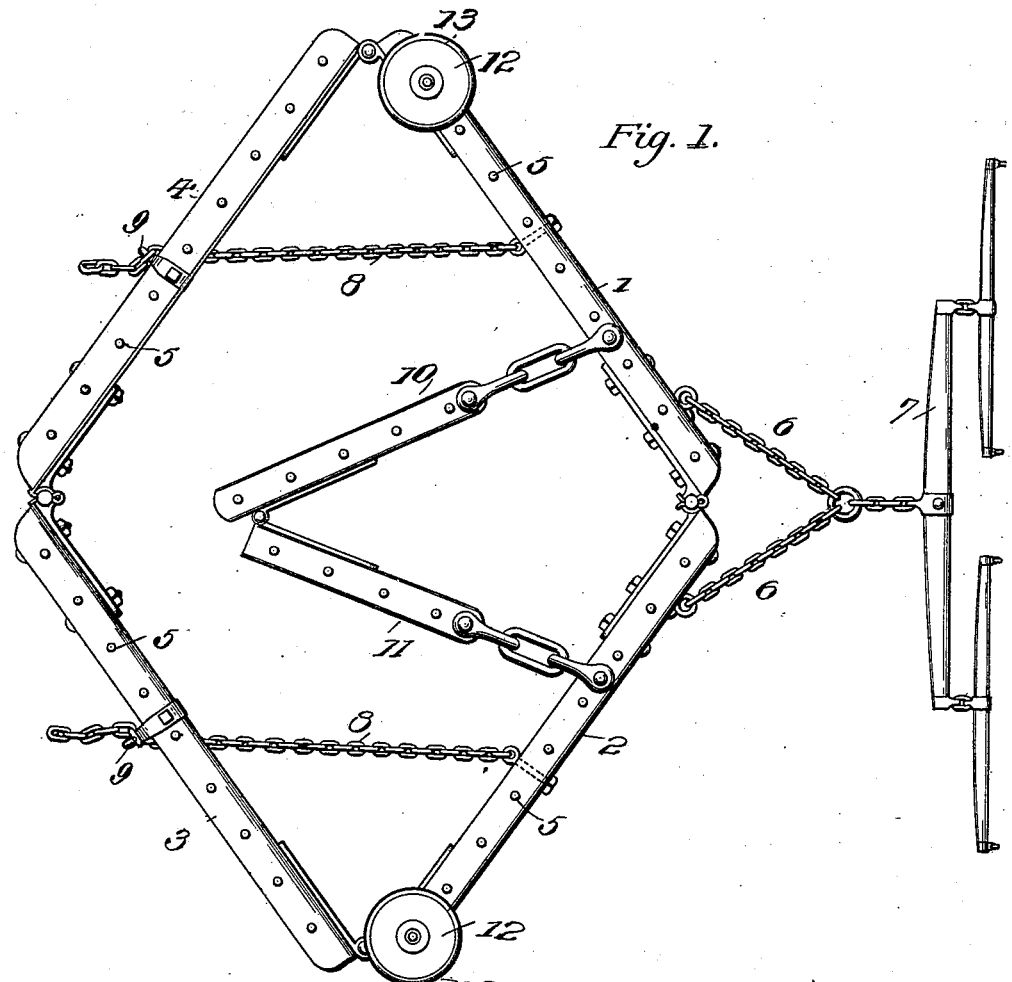
Figure 2:
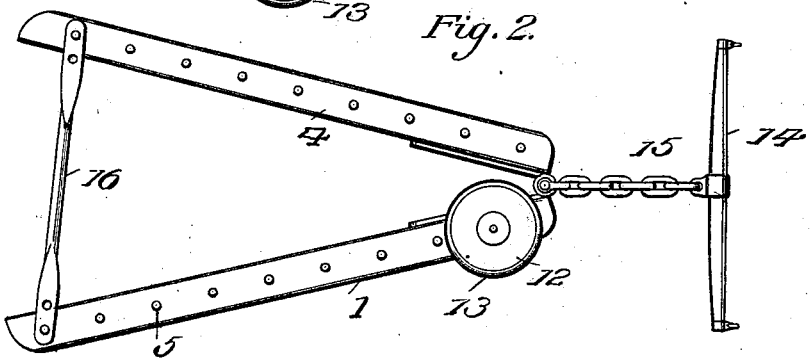

Figure 1 is a top plan view of a harrow embodying the invention. Fig. 2 is a plan view of a section of the harrow arranged for use in working around berry-bushes and between rows of plants.

Corresponding and like parts are referred to in the following description and indicated in both views of the drawings by the same reference characters.

The harrow is composed of four bars 1, 2, 3, and 4, hinged together at their meeting ends in such a manner as to prevent vertical movement of the bars at their pivotal or hinged ends, this being essential in order to secure stiffness and stability of structure after the parts have been assembled. Each of the frame-bars is provided with a series of teeth 5, of any desired form, and which teeth are spaced apart, so as to insure a thorough pulverizing of the soil and a breaking up of clods in the path of the implement as it is drawn over the field. Any two adjacent bars may constitute a harrow-section of V form and may be used independently of the other section for cultivating the soil around berry-bushes and between rows of plants. For the sake of illustration the frame-bars 1 and 2 will be referred to as one harrow-section and the frame-bars 4 and 3 as the other harrow-section, and these sections are arranged in reverse order, as clearly indicated in Fig. 1, the draft being applied to the foremost section by means of the convergent chain 6 and doubletree 7, the latter being hitched to the ring at the convergent ends of the chains and being provided at its extremities with singletrees to which the animals are harnessed in the usual manner. The width of the harrow is regulated by spreading the bars of the sections more or less, chains 8 limiting the spread of the sections when adjusted. The chains 8 are secured at their front ends to the toothed bars of the front section and their rear ends have adjustable connection with hooks 9, secured to the bars of the rear section.

The third harrow-section is located in the space inclosed by the bars 1, 2, 3, and 4 and is composed of toothed bars 10 and 11, hinged at one end and spread at the opposite end. The toothed bar 11 is hinged to the toothed bar 10 a short distance from the extremity of the latter, whereby the bars 10 and 11 are limited when separated at their forward or free ends by the square end of the bar 11 abutting against the side of the portion of the bar 10 in the rear of the pivot or hinge joint between the bars. The bars 10 and 11 are connected by links and clevises to the bars 1 and 2 and are therefore free to move laterally and vertically, and this harrow-section drops into a dead-furrow or other depression in the surface and insures action of the harrow thereon, so that every portion of the surface over which the harrow is drawn is treated or acted upon.

When the harrow is used in orchards, injury to the fruit-trees is prevented by contact of the harrow therewith by the provision of fenders 12, the same consisting of rotary disks mounted upon the outer end portions of the bars 1 and 2 and having their peripheries closed with rubber 13 or kindred material, which will prevent injury to the trees should the harrow strike the same. When it is desired to use a single section, as illustrated in Fig. 2, the draft is applied thereto by means of the singletree 14 and draft-chain 15, and the toothed bars are spread the required distance by means of a bar 16, the latter having adjustable connection with corresponding teeth near the rear or free ends of the bars. In this instance the section is composed of the bars 1 and 4, although any two bars may be selected, as previously indicated.

Having thus described the invention, what is claimed as new is—

1. A harrow or like implement comprising two front bars flexibly connected and forwardly convergent, two rear bars forwardly divergent, one of the bars being hinged at its inner rear corner to the side of the other bar a distance from its rear end, and flexible connections joining the forward ends of the rear bars to the front bars at a point between the ends thereof, substantially as set forth.

2. A harrow comprising two front bars flexibly connected, two rear bars flexibly connected to each other and to the front bars, a third pair of bars arranged in the space inclosed by the front and rear bars and forwardly divergent and flexibly connected at their forward ends to the front bars at a point between the ends thereof, and flexible connections spanning the angles formed between corresponding front and rear bars and connected thereto and adapted to be lengthened and shortened to vary the angle between the several pairs of bars and the spread of the implement, substantially as specified.

In testimony whereof I affix my signature in presence of two witnesses.

JACOB SMITH.

Witnesses:
G. N. SMITH,
F. P. GREER.